Patented Sept. 7, 1943

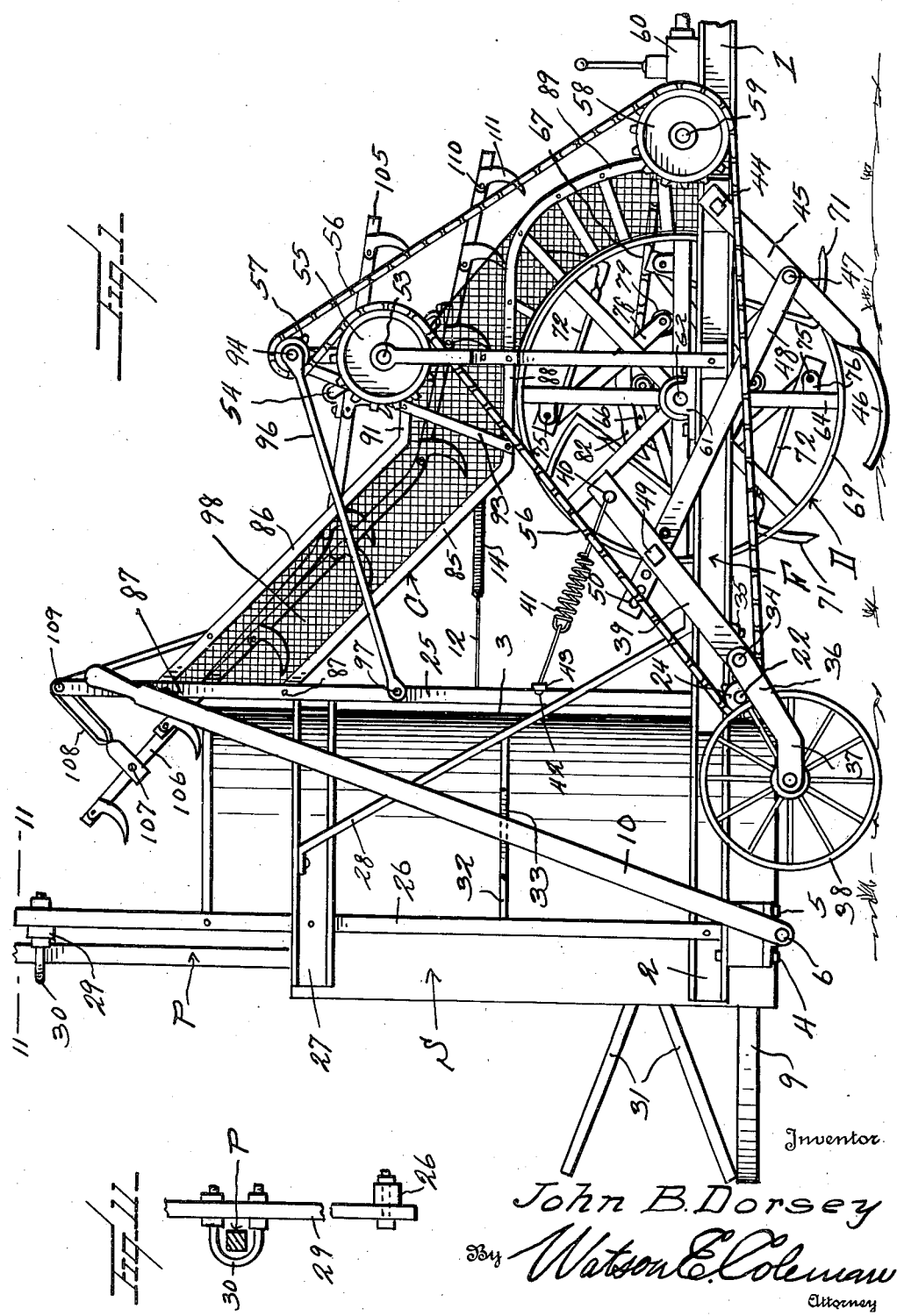

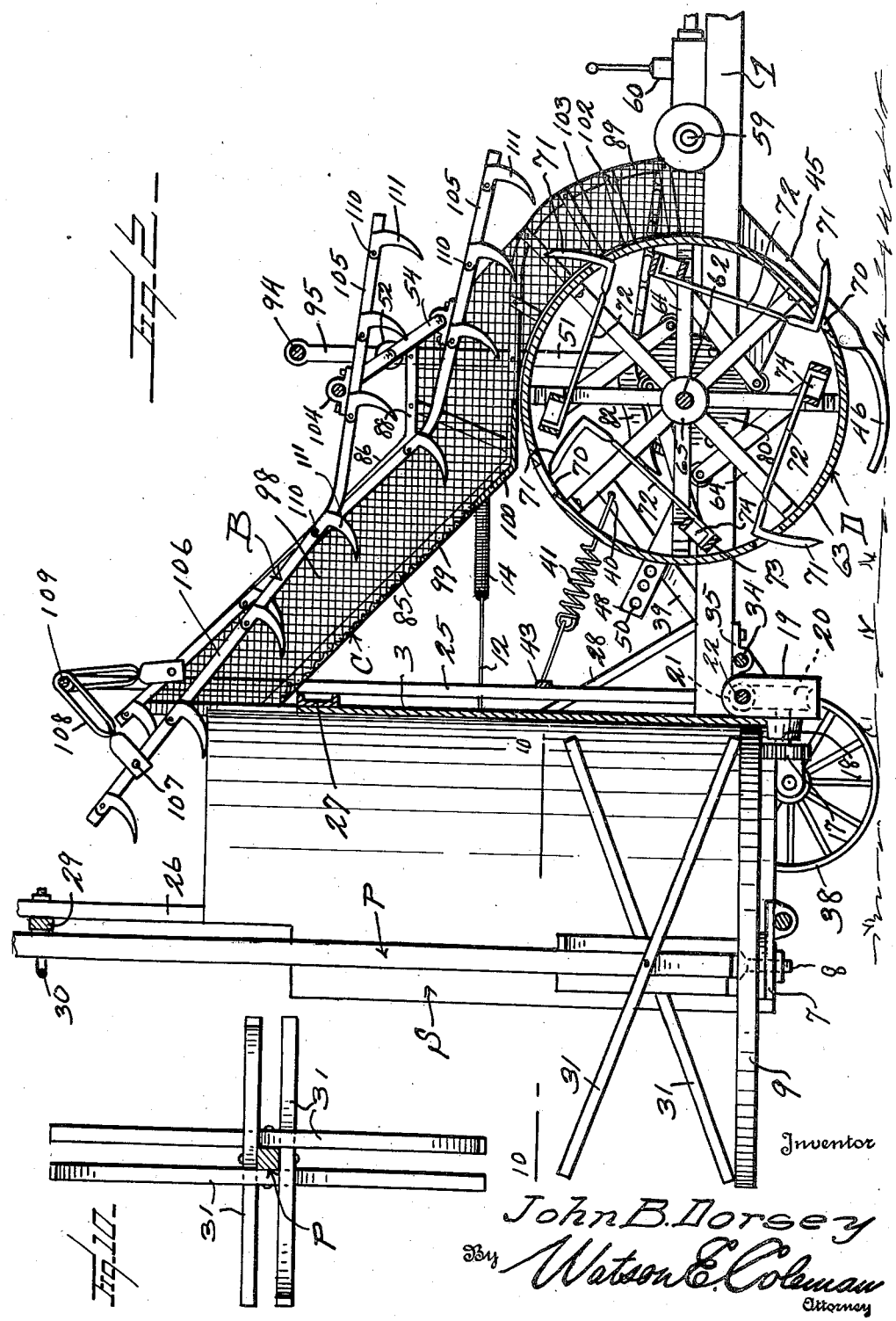

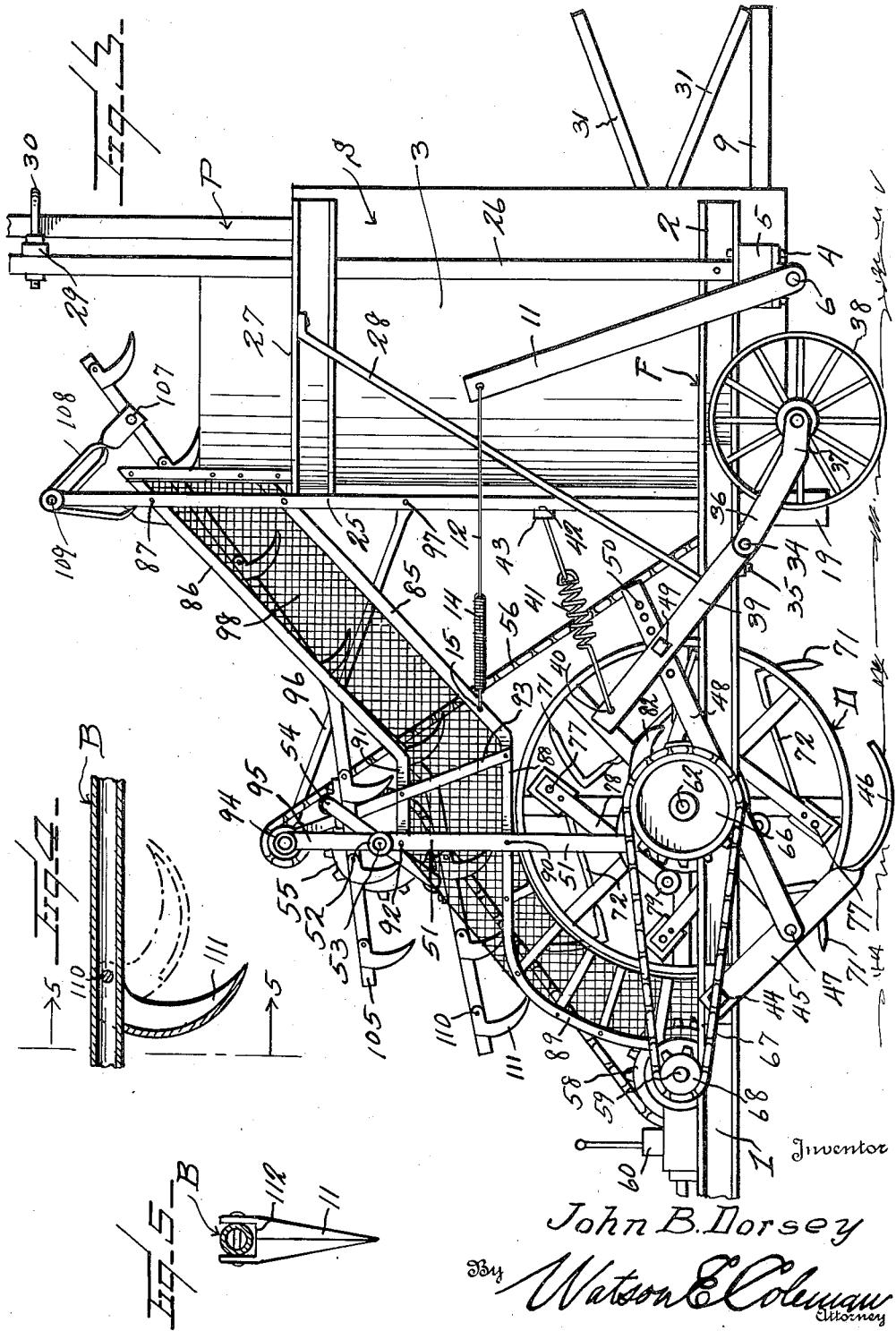

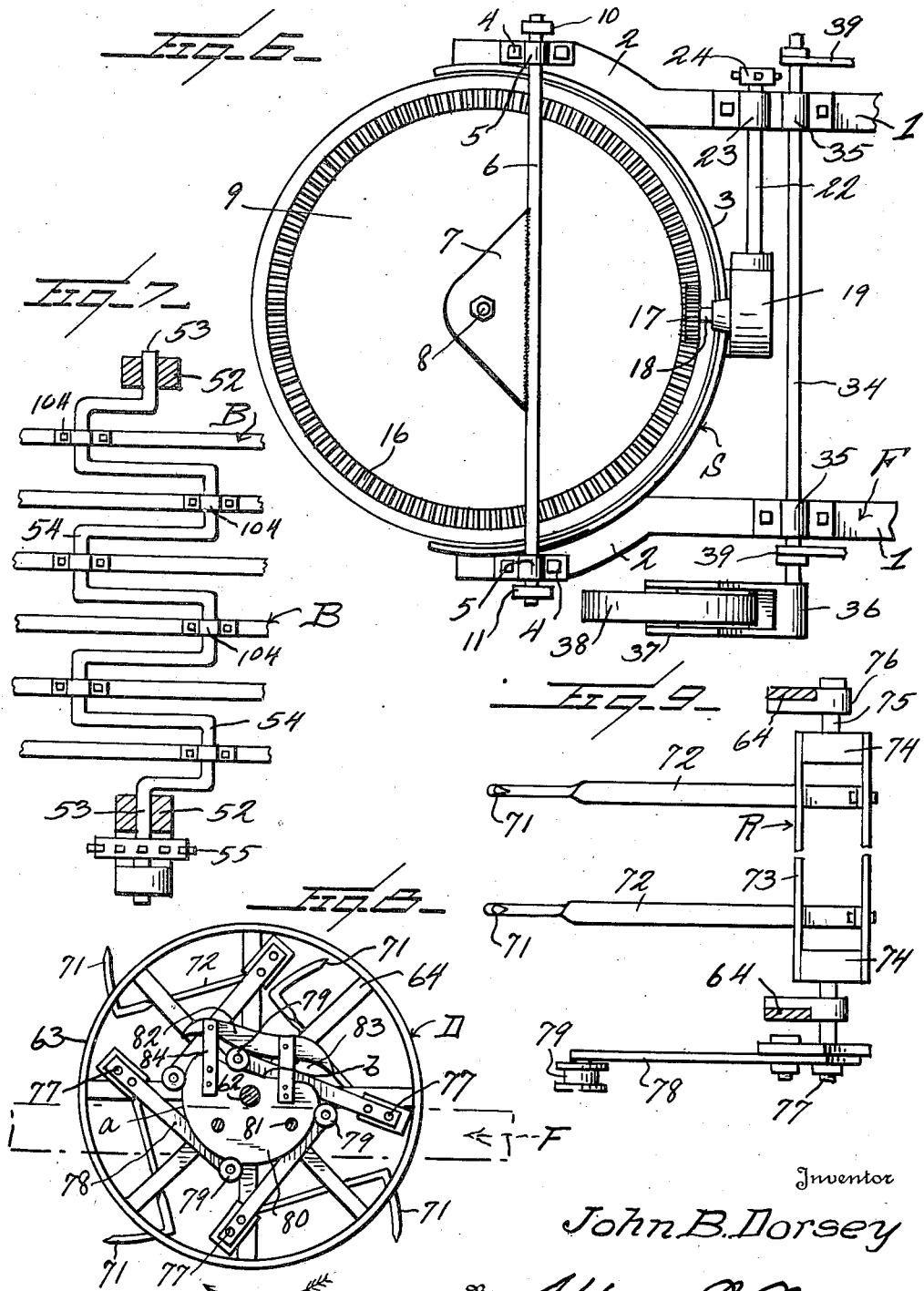

2,328,790

UNITED STATES PATENT OFFICE 2,328,790

PEANUT HARVESTING MACHINE

John B. Dorsey, Americus, Ga.

Application November 12, 1941, Serial No. 418,822

6 Claims. (Cl. 56—346)

This invention relates to a peanut harvesting machine, and it is a particular object of the invention to provide a machine of this kind which will plow and pick up peanut vines, separate the dirt and rocks therefrom and put the vines upon a stack pole.

It is also an object of the invention to provide a machine of this kind comprising a portable structure including a rotary pick-up element, and whereby the supporting means for the machine includes front runners acting as slides or shoes for the purpose of protecting the pick-up element by raising and lowering the same to pass over a high place in the ground or other obstruction, and which runners also serve to provide means whereby the entire machine is raised or lowered.

It is also an object of the invention to provide a machine of this kind including a pick-up element together with means whereby such element is allowed to operate in low places to harvest the vines, and also to raise said element to harvest the vines that may be on a high place in the field.

It is also an object of the invention to provide a harvester of this kind including a pick-up element together with means for conveying the vines from the pick-up element to a suitably positioned stack pole, such means for conveying the vines including oscillating carrier bars constructed and operated in a manner to not only effectively transport the vines from the pick-up element to the stack pole but at the same time operate effectively to separate clods or other foreign matter which may be retained by the vines after being taken from the pick-up element.

A still further object of the invention is to provide a machine of this kind with a rotary pick-up device, and wherein said pick-up device includes a rotatably supported drum having associated therewith a plurality of properly positioned spring fingers which are normally retracted together with means for projecting said fingers beyond the periphery of the drum to be in proper position to engage and pick up the vines while the drum is in rotation, and wherein said fingers are so constructed and mounted as to properly yield upon hitting an obstruction in the field such as a large rock.

It is also an object of the invention to provide a machine of this kind embodying a stacker including a revolving tilting bottom upon which a stack carrier is adapted to be mounted and upon which carrier the vines as withdrawn from the pick-up device are adapted to be wound.

The invention consists in the details of construction and in the combination and arrangement of the several parts of my improved peanut harvesting machine whereby certain important advantages are attained, as will be hereinafter more fully set forth.

In order that my invention may be the better understood, I will now proceed to describe the same with reference to the accompanying drawings, wherein:

Figure 1 is a view in side elevation of a peanut harvesting machine constructed in accordance with an embodiment of my invention;

Figure 2 is a vertical sectional view taken through the device as illustrated in Figure 1, at substantially the transverse center thereof, certain of the parts being in elevation;

Figure 3 is a view in side elevation of the machine opposite to that illustrated in Figure 1;

Figure 4 is a fragmentary view in section illustrating the mounting of one of the teeth of a carrier bar as herein embodied, a second position of said tooth being indicated by broken lines;

Figure 5 is a sectional view taken substantially on the line 5—5 of Figure 4;

Figure 6 is a fragmentary view in bottom plan of the rear portion of the machine as herein disclosed, and particularly illustrating the mounting and operating means for the stacker;

Figure 7 is a fragmentary detailed view in top plan of the crank shaft and the associated portions of the carrier bars engaged therewith;

Figure 8 is a view in end elevation of the pick-up element or drum as herein comprised unapplied, certain of the associated parts being in section;

Figure 9 is a fragmentary view, partly in top plan and partly in section, of one of the sets of spring fingers comprised in the construction of the pick-up element or drum;

Figure 10 is a fragmentary sectional view taken through the stack pole as herein embodied unapplied, the line of section being substantially on the line 10—10 of Figure 2; and Figure 11 is a detailed sectional view taken substantially on the line 11—11 of Figure 1, parts being in top plan.

As disclosed in the accompanying drawings, F denotes a base or supporting frame of desired dimensions and which comprises the suitably spaced and parallel side members 1, preferably I-beams, although, of course, I do not wish to be understood as limiting myself in this respect. These members 1 are tied or connected in any desired manner to maintain the same in required spaced relation. The rear portions of the members 1 are outwardly offset, as at 2, and have suitably anchored thereto, as by welding or as may be otherwise preferred, the upstanding back wall 3 for a stacker unit S. This wall 3 is preferably of metal and is of a cross-sectional form substantially semi-circular with its open side rearwardly directed. The offset portions 2 of the members or beams 1 have bolted, as at 4, or otherwise secured thereto the depending bearings 5 which provide mountings for a rock shaft 6. This shaft 6 is disposed transversely of the frame F and at a point inwardly of the axial center of the wall 3. The central portion of this shaft 6 is provided with a rearwardly disposed plate 7 herein set forth as substantially V-shaped in form with its apex outwardly directed. Mounted at its axial center, as at 8, to this plate 7 is is a circular bottom table or platform 9. This table or platform 9 is of such radius as to have its rear portion snugly received within the lower portion of the wall 3 when the table or platform 9 is in its lowered position, or what may be termed its horizontal adjustment. The rock shaft 6 extends outwardly beyond the side members or beams 1 of the frame F and to one extended portion is fixed the lower end portion of an upstanding hand lever 10. This lever provides means whereby the table or platform 9, when desired, may be readily tilted or inclined to dump the load thereon, as will hereinafter be more particularly referred to.

The opposite extended portion of the shaft 6 carries and upstanding rock arm 11 with which is operatively engaged by a suitable strand 12 an end portion of a retractile spring 14. The opposite end portion of this spring 14 is secured, as at 15, to one of the members of a superstructure carried by the frame F to which particular reference will hereinafter be made. This spring or retractile member 14 is of a tension sufficient to urge the table or platform 9 to its lowered or horizontal position and to normally maintain the table or platform in such position.

The under surface of the table or platform 9 is provided with an annular rack 16 concentric to the mounting 8 for the table or platform 9 and about which said table or platform 9 rotates. Meshing with this annular rack 16 is a gear 17 carried by a shaft 18 extending within a gear box 19. This box 19, as herein disclosed, is welded or otherwise rigidly secured to the lower central portion of the wall 3 of the structure S, with the shaft 18 below said wall 3, as is clearly illustrated in Figure 2 of the drawings. Fixed to the shaft 18 and arranged within the box 19 is a worm gear 20 meshing with a worm 21 carried by a transversely disposed shaft 22. This shaft 22 is rotatably supported by the box 19 and by a suitably positioned bearing 23 carried by one of the side members or beams 1 of the frame F. The shaft 22 extends outwardly beyond the side member or bar 1 upon which it is mounted and said extended portion of the shaft 22 carries a sprocket wheel 24 for operative connection with a suitable source of power whereby the table or platform 9 may be caused to rotate at a required speed.

It is believed to be obvious that the speed of rotation of the table or platform 9 will be in accordance with the speed of rotation of the shaft 22 together with the ratio of the worm 21 with the worm gear 20, and also the ratio of the gear 17 with respect to the rack 16. The platform or table 9 is adapted to have mounted thereon for rotation therewith a stack pole P which will hereinafter be more fully explained.

The beams or members 1 forwardly of but in relatively close proximity to the back wall 3 of the stacker unit S are provided with the upstanding posts 25, each of which being of a length to terminate a material distance above the back wall 3. The offset portions 2 of the side members or beams 1 are also provided with the upstanding posts 26 of a length to terminate above the wall 3 of the stacker unit S. These posts 25 have secured thereto the extremities of a substantially semi-circular beam 27 which surrounds the upper portion of the wall 3, and to which said wall is suitably secured. Coacting with the free end portions of this beam 27 and the side members or beams 1 of the frame F are the downwardly and forwardly inclined bracing and supporting bars 28.

The posts 26, at a desired distance above the wall 3 of the stacker unit S, are tied or connected by a transversely disposed rod 29. This rod 29 is provided at its longitudinal center with a rearwardly disposed eye member 30 through which the upper portion of the pole P is freely insertible from below. This engagement of the upper portion of the pole P through the eye member 30 can be readily effected by the operator properly inclining the pole P. When the pole P is in applied or working position the lower end thereof rests upon the central portion of the table or platform 9, and said lower portion of the pole P is provided with the elongated crossed cleats or bars 31. These cleats or bars 31, as herein disclosed, are arranged in pairs and with said pairs two in number. Each of the pairs is substantially perpendicularly related with respect to the other. The cleats 31, or more particularly the lower end portions of such cleats, contact with the table or platform 9 and provide means whereby the pole P is held in desired upright position upon the table or platform 9. The upper or extended portion of the cleats or bars 31 serve to hold up the peanut vines wound upon the upper portion of the pole P so that when the pole P with the vines thereon is removed the same can be stacked on the ground with the vines wound on the pole free of the ground. When the table or platform 9 is tilted the lower portion of the pole will readily slide off of the platform or table and the eye member 30 is of sufficient diameter to allow the upper portion of the pole P to readily slide downwardly and outwardly therethrough.

As is particularly illustrated in Figure 2, the lowered or horizontal position of the table or platform 9 is maintained by the gear 17 when the rack 16 is in mesh therewith. It is also believed to be obvious that this meshing of the rack 16 and the gear 17 permits unhampered tilting of the table or platform 9 when it is desired to dump the stack pole P.

The posts 25 and 26 at the same side of the frame F as the elongated upstanding lever 10 are connected by a slotted bracket 32 through the slot 33 of which the lever 10 is freely disposed. This bracket serves as a guiding means for the upper portion of the lever 10 and assures the same being maintained in substantially a fixed line of travel.

Disposed transversely of the frame F closely adjacent to the shaft 22 is a rock shaft 34 held to the side members or beams 1 of the frame F by the conventional bearings 35. Each end portion of this shaft 34 is provided with a depending and rearwardly disposed rock arm 36 having a fork 37 which provides a mounting for a ground engaging wheel 38. Each outer end portion of the shaft 34 is provided with an upwardly and forwardly inclined elongated rock arm 39. To the upper portion of this arm 39 is suitably anchored, as at 40, an end portion of a retractile member 41, the opposite end portion of which being anchored, as at 42, to a suitably positioned cross bar 43 connecting the posts 25 at a desired distance above the frame F. The retractile member 41 is herein disclosed as a coil spring and possesses sufficient tension to exert pull upon the rock arm 39 and, of course, to urge the wheels 38 downwardly whereby the rear portion of the machine may be raised.

Pivotally connected, as at 44, with the forward end portion of each of the members or beams 1 of the frame F is a downwardly and rearwardly disposed elongated arm 45 terminating in a rearwardly directed elongated shoe or runner 46. This runner 46 is preferably curved lengthwise to facilitate its travel over the ground, and more particularly over such obstructions with which it may contact.

The arm 45 intermediate its ends has pivotally connected thereto, as at 47, an upwardly and rearwardly disposed elongated rigid lever 48 which is pivotally secured by a removable bolt 49 or the like to the upper and forward portion of the adjacent rock arm 39. This runner or shoe 46 is constantly urged toward the ground under the action of the retractile member or spring 41. However, upon the shoe or runner 46 striking a large rock or other abnormal obstruction, the resultant upward swinging movement of the arm 45 will swing the associated arm 39 upwardly and rearwardly and the adjacent fork 37 and wheel 38 downwardly. This action will effect a raising of the lower portion of the machine so that said portion, and more particularly the pick-up element or drum D, will pass over such obstruction. It is believed to be obvious that this raising of the rear portion of the frame is assured due to the fact that the wheels 38 are considerably off center with respect to the shaft 34, and it is to be also stated that the springs 41 are of a strength to hold the load at all times at the rear portion of the machine.

It is to be noted that the pivot bolt 49 connecting each adjacent arm 39 and lever 38 is selectively disposed through one of the longitudinally spaced openings 50 in the upper rear end portion of the lever 48, as the requirements of practice may necessitate.

Each of the side members or beams 1, at the forward portion thereof, is provided with an upstanding post 51, the upper portion of which being provided with a bearing 52. The bearing 52 of one post 51 is in alignment with the bearing 52 of the post 51 at the opposite side of the frame, and rotatably engaged within each of these bearings 52 is an end portion of a shaft 53. This shaft 53 is provided with a desired number of reversely arranged cranks 54 all of the same throw. One end portion of the shaft 53 has fixed thereto a sprocket wheel 55 with which is operatively engaged an endless sprocket chain 56. This chain is also operatively disposed around an idle or guiding sprocket 57 rotatably supported by the post 51 above the sprocket 55. This chain 56 is disposed downwardly and forwardly and operatively engaged around a drive sprocket 58 carried by a shaft 59 at the forward portion of the frame F and disposed transversely thereof. This shaft 59 is adapted to be connected through a conventional transmission 60 with the take-off shaft of a tractor or other suitable source of power.

The chain 56 also extends from the sprocket 58 and is operatively engaged around the sprocket 24 hereinbefore referred to, and the sprocket chain 56 extends from this sprocket 24 to the sprocket 55. It is believed to be obvious that the chain 56 together with its associated sprockets provide means whereby is driven in desired directions of rotation the shaft 22 and the shaft 53. At a predetermined distance in advance of the stacker unit S the side members or beams 1 of the frame F are provided with the transversely aligned bearings 61 which provide mountings for the central axle 62 of the pick-up element or drum D. This element or drum D comprises an elongated tubular member 63 of desired diameter, and has connected to each end portion the spokes 64 radiating from a hub 65 mounted on the axle 62 for rotation therewith. One end portion of this axle 62 carries a sprocket 66 with which is operatively engaged an endless chain 67 also in operative engagement with a sprocket 68 fixed to the driven shaft 59 for rotation therewith.

The drum D is provided in its wall 69 with a plurality of series of circumferentially and equidistantly spaced openings 70. As herein disclosed, the openings 70 in each series are four in number, although this number may be increased or reduced as preferred. Freely movable through each of the openings 70 is a pick-up finger 71 carried by the outer extremity of an elongated arm 72 positioned within the drum D. The finger 71 and its associated arm 72 are substantially in right angular relation and the inner end portion of each of the arms 72 is operatively secured to a rocker element R. As is particularly illustrated in Figure 9, this element R comprises two elongated rigid side members 73 having their end portions rigidly secured to interposed blocks 74. These blocks 74, at the axial centers thereof, are provided with the outstanding trunnions 75 which are rotatably engaged with the bearing brackets 76 securely anchored to opposed spokes 64 of the drum D.

It is believed to be apparent from the accompanying drawings that the rocker elements R are of a number equal to the number of openings 70 in a series of such openings, and that each of the rocker elements R has secured thereto arms 72 of a number equal to the number of series of openings so that upon rocking movement of a rocker element R all of the arms 72 carried thereby will swing in a direction to project their fingers 71 outwardly beyond the periphery of the drum D through openings 70 of all of the series aligned lengthwise of the drum D. As the arms 72 swing in the opposite direction the fingers 71 will be fully retracted within the drum D.

One of the trunnions 75 extends outwardly beyond its adjacent spoke 64 of the drum D and fixed, as at 77, to said extended portion of the trunnion is an elongated rock arm 78 provided at its outer or free end portion with a grooved roller 79 which rides upon the edge of a cam disk 80. This cam 80 is freely mounted on the axle 62 for the drum D but is fixedly secured, as at 81, to an adjacent side member or beam 1 of the frame F.

The cam 80 has a high portion $a$ concentric to the axle 62 and extending, in the present embodiment of the invention, more than one-half around the cam 80. The extremities of this high portion $a$ merge into a connecting undulating low point $b$ with which coacts a complemental guide strip 82 spaced from the portion b to provide a trackway or slot 83 through which rides the roller 79. The guide strip 82, as herein disclosed, is held in desired position with respect to the cam 80 by the rigid connecting links or arms 84.

The trackway or slot 83 is so positioned with respect to the axle 62 when the cam 80 is applied, to assure complete retraction of the fingers 71 carried by the arms 72 of a rocker element R, and said trackway or slot 83 is also positioned to assure the projection of the fingers 71. The trackway or slot 83 operates to retract the fingers 71 after they have passed upwardly beyond the vertical center, while the high portion a serves to maintain the fingers 71 extended until after the fingers pass down beyond the horizontal and until they have passed upwardly a material distance above the horizontal. This operation of the fingers 71 allows the fingers to rake up the vines over which the macihne passes and raise up the vines for delivery to the upwardly and rearwardly disposed conveyor C which discharges above upon the stacker unit S. While it is believed to be apparent from the drawings, yet it is to be noted that the cam 80 is common to all of the elements R, or more particularly the rock arms 78 thereof.

The conveyor C comprises lower side bars 85 and upper side bars 86. These bars 85 and 86 are suitably secured, as at 87, to the upper portions of the posts 25. The lower end portion of each of the arms 85 is continued by a forwardly directed extension 88 which is disposed over the drum D in relatively close proximity thereto and terminates in a depending part 89 in advance of the drum D with its lower end in close proximity to the frame F. This portion or extension 88 is suitably anchored, as at 90, to the adjacent upstanding post 51. The lower end of each of the upper bars 86 is provided with a forwardly disposed extension 91 anchored, as at 92, to the adjacent post 51. The extended portions 88 and 91 have secured thereto a bracing member 93 which extends upwardly above the conveyor and is attached to the shaft 94 to which is fixed the idle or guiding sprocket 57. This shaft 94 is rotatably supported by the upstanding bracket arms 95 which constitute extensions of the posts 51. The shaft 94 adjacent to the sprocket 57 has freely engaged therewith an end portion of a bracing rod 96 which extends to and is anchored, as at 97, to one of the posts 25.

The members 85 and 86 are connected by a reticulated side wall 98, preferably a wire mesh fabric of desired gage, and the lower members 85 are connected by the bottom reticulated wall 99, preferably a wire mesh fabric of predetermined gage. The space between the lower extensions 88 is open except for an imperforate bottom wall 100 at the rear portions of said extensions 88, and which bottom wall 100 has an upwardly extending portion 101 between the bottom portions of the lower members 85. The forward or free edge of the bottom wall 100, as illustrated in Figure 2, terminates at substantially the vertical center of the drum D, and it is to be pointed out at this time that the fingers 71 will be fully retracted within the drum D just about the time they reach this forward edge of the bottom wall 100.

Each of the extensions 88 is provided therealong with the spaced depending arms 102 to which are suitably secured the side guide walls 103 of reticulated material, preferably wire mesh fabric of desired gage. Each of these side walls closely approaches the periphery of the drum D so as to hold against displacement the vines picked up by the fingers 71 and carried to the lower end portion of the conveyor C. It is believed to be readily understood that as the fingers 71 are retracted within the drum D they will be entirely freed from the vines.

Each of the cranks 54 has freely engaged therewith a bearing 104 carried by the forward straight portion 105 of a carrier bar B. This bar B has a rear straight portion 106 disposed on a desired angle with respect to the forward portion 105, and which portion 106 is directed upwardly and rearwardly. This portion 106 is also of a length to extend beyond the upper end of the carrier C and to partially overlie the stacker units S. The portion 105 is of a material length but not of the same length as the portion 106. The upper or rear extremity of the portion 106 of the bar B has securely affixed thereto, as at 107, an upstanding and substantially perpendicularly related rigid loop member 108 which is freely engaged with the bar or rod 109 disposed transversely of the frame F at a point above the upper end portion of the carrier C and interposed between and operatively supported by the upper extremities of the posts 25.

There is a carrier bar B operatively engaged with each of the cranks 54 and the mounting of these bars B through the medium of the loop member 108 and the cranks 54 allow the bars B to be oscillated with the throw of each of the cranks 54 being such as to extend the forward extremity of the portion 105 outwardly beyond the drum D and in relatively close proximity to the periphery of the drum when the crank 54 is at its lowermost position. The bar B, at spaced points along both of its portions 105 and 106, has pivotally connected thereto, as at 110, a plurality of curved teeth 111, said teeth being free to swing rearwardly with respect to the bar B as said bar B moves forwardly. However, as illustrated in Figure 5, the construction of each of the teeth 111 is such that upon rearward or upward movement of the bar B the tooth 111 is held against movement beyond center by contact of the intermediate portion 112 of the tooth with the bar B.

It is believed to be obvious from the foregoing description in connection with the accompanying drawings that as the machine as herein disclosed passes over the lifted vines the finger 71 will pick up the vines as the machine advances and carry them up between the side walls 103 to the bottom of the conveyor C. The movement of the bars B will cause the teeth 111 to so engage the raised vines as to readily take the same off of the drum D and to feed such vines upwardly of the carrier C so that said vines may drop within the stacker unit S and be caused to wind around the stack pole P positioned upon the rotating or revolving table or platform 9. After the stack pole has been properly filled, it is only necessary to give requisite pull upon the lever 10 to tilt the table or platform 9 in a direction to discharge the filled or wrapped pole P from the table or platform 9. The discharged pole with its wrapping of vines can be readily placed upright upon the ground through the medium of the cleats 31 and thereby avoiding the necessity of requiring a hole in the ground for the insertion of the pole.

It is also to be pointed out that as the vines pass up the conveyor C the bars B, or more particularly the teeth 111 carried thereby, provide effective means for separating dirt and trash from the vines and which foreign matter in nearly all cases will readily pass through the reticulated side walls 98 and reticulated bottom wall 99. It is also to be stated that the arms 72 are of sufficient inherent resiliency to allow the fingers 71 to spring back into the drum D when the fingers hit a large rock or other obstruction in the field.

The runners or shoes 46 are so positioned with respect to the drum D to allow the drum to go down in low places to get the vines or to raise the drum where the vines have grown on a hedge row or some high place in the field, and the springs 41 maintain such pressure on the shaft 34 through the rock arms 39 to effect raising of the machine with small resistance created when the shoes or runners 46 strike high or low places. It is to be further stated that the tension of these springs 41 is such to hold a complete load as well as the shaft 34.

From the foregoing description it is thought to be obvious that a peanut harvesting machine constructed in accordance with my invention is particularly well adapted for use by reason of the convenience and facility with which it may be assembled and operated.

I claim:

1. A machine for harvesting peanuts and the like comprising a frame, ground engaging runners pivotally connected with the forward portion of the frame, ground engaging supporting members for the rear portion of the frame, means for connecting said members for up and down swinging movement, means operatively connecting the runners and the ground engaging members for causing the ground engaging members to be urged downwardly upon upward swinging movement of the runners, vine lifting means carried by the frame, a stacker unit carried by the frame and positioned rearwardly of the vine lifting means, and means for conveying the vines from the lifting means to the stacker unit.

2. A machine for harvesting peanuts and the like comprising a frame, ground engaging runners pivotally connected with the forward portion of the frame, ground engaging supporting members for the rear portion of the frame, means for connecting said members for up and down swinging movement, means operatively connecting the runners and the ground engaging members for causing the ground engaging members to be urged downwardly upon upward swinging movement of the runners, vine lifting means carried by the frame, a stacker unit carried by the frame and positioned rearwardly of the vine lifting means, and means for conveying the vines from the lifting means to the stacker unit, said stacker unit including a revolving platform on which a stack pole is adapted to be placed.

3. A machine for harvesting peanuts and the like comprising a frame, ground engaging runners pivotally connected with the forward portion of the frame, ground engaging supporting members for the rear portion of the frame, means for connecting said members for up and down swinging movement, means operatively connecting the runners and the ground engaging members for causing the ground engaging members to be urged downwardly upon upward swinging movement of the runners, vine lifting means carried by the frame, a stacker unit carried by the frame and positioned rearwardly of the vine lifting means, means for conveying the vines from the lifting means to the stacker unit, said stacker unit including a revolving platform on which a stack pole is adapted to be placed, means for supporting said revolving platform for tilting movement, and means for tilting the platform.

4. A machine for harvesting peanuts and the like comprising a frame, ground engaging runners pivotally connected with the forward portion of the frame, ground engaging supporting members for the rear portion of the frame, means for connecting said members for up and down swinging movement, means operatively connecting the runners and the ground engaging members for causing the ground engaging members to be urged downwardly upon upward swinging movement of the runners, vine lifting means carried by the frame, a stacker unit carried by the frame and positioned rearwardly of the vine lifting means, means for conveying the vines from the lifting means to the stacker unit, said stacker unit including a revolving platform on which a stacker pole is adapted to be placed, means for supporting said revolving platform for tilting movement, means for tilting the platform, and automatic means for returning the platform and maintaining the same in such returned position.

5. A harvesting machine of the class described, comprising in combination a portable body, a pick-up means carried thereby, a stacker unit, a conveying means leading from the pick-up means to the stacker unit, a rotating platform included in the stacker unit, a member carried by the body and disposed across and above the stacker unit, an enlarged eye element carried by said member, a stack pole, and means carried by the stack pole for freely mounting the same in an upright position upon the platform, said pole being of a length to freely extend through the eye element when the pole is in upright position upon the platform.

6. A harvesting machine of the class described, comprising in combination a portable body, a pick-up means carried thereby, a stacker unit, a conveying means leading from the pick-up means to the stacker unit, a rotating platform included in the stacker unit, a member carried by the body and disposed across and above the stacker unit, an enlarged eye element carried by said member, a stack pole, means carried by the stack pole for freely mounting the same in an upright position upon the platform, said pole being of a length to freely extend through the eye element when the pole is in upright position upon the platform, means for mounting the rotatable platform for tilting movement, and means for tilting the platform for discharging therefrom the stack pole positioned on the platform.

JOHN B. DORSEY.